United States Patent
Yoshikawa et al.

(10) Patent No.: US 8,896,179 B2
(45) Date of Patent: Nov. 25, 2014

(54) MOTOR AND ELECTRONIC DEVICE COMPRISING THE SAME

(71) Applicant: Panasonic Corporation, Kadoma-shi, Osaka (JP)

(72) Inventors: Yuichi Yoshikawa, Osaka (JP); Hiroshi Murakami, Osaka (JP); Atsuyoshi Koshiba, Tottori (JP); Haruki Kato, Tottori (JP); Yasuo Kunishige, Tottori (JP); Koji Kadowaki, Tottori (JP); Hiroyuki Asai, Hyogo (JP)

(73) Assignee: Panasonic Corporation, Osaka (JP)

( * ) Notice: Subject to any disclaimer, the term of this patent is extended or adjusted under 35 U.S.C. 154(b) by 43 days.

(21) Appl. No.: 13/733,702

(22) Filed: Jan. 3, 2013

(65) Prior Publication Data

US 2013/0119835 A1    May 16, 2013

Related U.S. Application Data

(63) Continuation of application No. 12/741,460, filed as application No. PCT/JP2008/003268 on Nov. 12, 2008, now Pat. No. 8,368,278.

(30) Foreign Application Priority Data

Nov. 15, 2007  (JP) ................................ 2007-296528
Feb. 7, 2008   (JP) ................................ 2008-027458
Feb. 14, 2008  (JP) ................................ 2008-032863

(51) Int. Cl.
*H02K 1/02* (2006.01)
*H02K 1/06* (2006.01)
(Continued)

(52) U.S. Cl.
CPC .......... *H02K 1/2706* (2013.01); *H02K 11/0021* (2013.01); *H02K 1/146* (2013.01); *H02K 1/148* (2013.01); *H02K 1/187* (2013.01); *H02K 21/222* (2013.01); *H02K 11/001* (2013.01)

USPC ............... 310/216.064; 310/67 R; 310/68 B; 310/216.057; 310/216.091; 310/216.097; 310/216.098; 360/99.08

(58) Field of Classification Search
CPC ... H02K 1/146; H02K 1/187; H02K 11/0021; H02K 21/22
USPC ............ 310/216.057, 216.064, 216.091, 310/216.097, 216.098, 68 B, 67 R; 360/99.08
IPC ...................................... H02K 1/02, 1/06, 1/16
See application file for complete search history.

(56) References Cited

U.S. PATENT DOCUMENTS 3,123,747 A  3/1964  Glass
4,575,652 A  3/1986  Gogue
(Continued)

FOREIGN PATENT DOCUMENTS

JP  53-125002 A  10/1978
JP  02-133042 A  5/1990
(Continued)

OTHER PUBLICATIONS

International Search Report for International Application No. PCT/JP2008/003268, dated Jan. 13, 2009, 2 pages.

*Primary Examiner* — John K Kim

(57) ABSTRACT

A motor comprising a stator having a plurality of magnetic poles disposed in a circumferential direction along an outer periphery thereof, a rotor disposed rotatably around the outer periphery of the stator, and a magnet disposed in a circumferential direction along an inner periphery of the rotor. The stator is formed by laminating sheet-like plates. A plurality of the sheet-like plates including an outermost layer of this laminated body comprises a flat portion substantially perpendicular to the magnet, and an extended portion bent to a direction substantially parallel to the magnet. A part of the sheet-like plate having the extended portion disposed to the outermost side is formed into a thickness smaller than thicknesses of the other parts.

12 Claims, 8 Drawing Sheets

(51) Int. Cl.
*H02K 1/16* (2006.01)
*H02K 1/27* (2006.01)
*H02K 1/18* (2006.01)
*H02K 21/22* (2006.01)
*H02K 11/00* (2006.01)
*H02K 1/14* (2006.01)

(56) References Cited

U.S. PATENT DOCUMENTS

| | | | |
|---|---|---|---|
| 4,701,653 A * | 10/1987 | Merkle et al. | 310/152 |
| 4,902,941 A | 2/1990 | Merkle et al. | |
| 5,047,682 A | 9/1991 | Burgbacher | |
| 5,604,389 A | 2/1997 | Nitta et al. | |
| 6,628,028 B2 | 9/2003 | Yoshida et al. | |
| 7,268,450 B2 | 9/2007 | Takeuchi | |
| 7,327,066 B2 | 2/2008 | Gomyo et al. | |
| 7,368,844 B2 * | 5/2008 | Hashiba et al. | 310/216.048 |
| 7,456,540 B2 | 11/2008 | Gomyo et al. | |
| 8,368,278 B2 * | 2/2013 | Yoshikawa et al. | 310/216.064 |
| 8,680,737 B2 * | 3/2014 | Kawasaki et al. | 310/216.064 |
| 2003/0090168 A1 | 5/2003 | Takano et al. | |
| 2006/0085807 A1 * | 4/2006 | Nishidate | 720/697 |
| 2006/0197401 A1 * | 9/2006 | Takamatsu et al. | 310/216 |
| 2006/0197402 A1 | 9/2006 | Gomyo et al. | |
| 2007/0013255 A1 * | 1/2007 | Wakitani et al. | 310/216 |
| 2007/0267927 A1 * | 11/2007 | Chen | 310/68 B |
| 2008/0106167 A1 * | 5/2008 | Gomyo et al. | 310/216 |
| 2010/0219714 A1 * | 9/2010 | Abe et al. | 310/216.048 |
| 2010/0259126 A1 | 10/2010 | Yoshikawa et al. | |
| 2010/0314965 A1 * | 12/2010 | Yoshikawa et al. | 310/216.111 |
| 2010/0327691 A1 * | 12/2010 | Yoshikawa et al. | 310/216.111 |
| 2011/0001386 A1 * | 1/2011 | Kawasaki et al. | 310/216.064 |
| 2013/0119835 A1 * | 5/2013 | Yoshikawa et al. | 310/68 R |

FOREIGN PATENT DOCUMENTS

| | | |
|---|---|---|
| JP | 06-296353 A | 10/1994 |
| JP | 09-285044 A | 10/1997 |
| JP | 2002-250888 A | 9/2002 |
| JP | 2005151741 A * | 6/2005 |
| JP | 2006-166637 A | 6/2006 |
| JP | 2007-244004 A | 9/2007 |

* cited by examiner

MOTOR AND ELECTRONIC DEVICE COMPRISING THE SAME

RELATED APPLICATIONS

This application is a continuation application of U.S. patent application Ser. No. 12/741,460 filed on May 5, 2010, which is a 371 application of PCT/JP2008/003268 having an international filing date of Nov. 12, 2008, which claims priority to JP 2007-296528 filed on Nov. 15, 2007, JP 2008-027458 filed on Feb. 7, 2008, and JP 2008-032863 filed on Feb. 14, 2008, the entire contents of which are incorporated herein by reference.

TECHNICAL FIELD

The present invention relates to motors and electronic devices using the motors.

BACKGROUND ART

An electronic device such as a laser printer has a paper feed roller (i.e., driven unit) coupled with a motor and disposed inside a main unit casing, and this motor drives the paper feed roller to rotate and deliver paper to a predetermined section.

The above motor comprises a stator having a plurality of magnetic poles disposed at first predetermined intervals in a circumferential direction along an outer periphery thereof, and a rotor disposed around the outer periphery of the stator. The rotor has a structure comprising magnets disposed at second predetermined intervals in a circumferential direction along an inner periphery thereof with their poles magnetized alternately to have different polarities.

The stator is also provided with an extended portion formed on each of the magnetic poles in a manner to extend from the base of the magnetic pole into a direction generally parallel to the magnets to thereby improve a driving efficiency.

That is, the magnets are made larger in width (i.e., the width in a direction orthogonal to the circumferential direction) than a width at the base of the magnetic poles of the stator in the same direction (i.e., the direction orthogonal to the circumferential direction) in order to bring the magnets as close as possible to a magnetic sensing element for magnetically sensing rotation of the rotor. It is for this reason that the conventional motor comprises the extended portions extended from the base of the magnetic poles into the direction generally parallel to the magnets to gain a high driving efficiency. Patent literature 1, for instance, discloses a technique similar to the above.

In the conventional motor, the extended portions formed to extend from the base of the magnetic poles into the direction parallel to the magnets in the manner as described above can increase an area where the magnets of the rotor confront the magnetic poles of the stator. It has been believed in general that the driving force can be increased by increasing the confronting area, and hence the driving efficiency as well.

According to the studies made by the inventors of this application, however, it was found not necessarily possible to increase the driving force by simply providing the extended portions.

In other words, it is the area where the magnets of the rotor confront the magnetic poles of the stator, enlargement of which can improve the driving force according to the general conception. This suggests that the extended portions from the electrodes of the stator be increased as large as possible. When the extended portions are enlarged an amount of magnetic flux from the confronting magnets also increases proportionally however, and this gives rise to a problem that a magnetic saturation can result in a magnetic path of the stator communicating the magnetic poles. There is also another problem that the extended portions become a factor of reducing the driving efficiency due to a large eddy current loss generated therein when the extended portions have a large thickness since they receive the magnetic flux of a considerable amount in a direction orthogonal thereto from the magnets.

Patent Literature 1: Japanese Patent Unexamined Publication, No. 1997-285044

SUMMARY OF THE INVENTION

A motor of the present invention comprises a stator having a plurality of magnetic poles disposed in a circumferential direction along an outer periphery thereof, a rotor disposed rotatably around the outer periphery of the stator and a magnet disposed in a circumferential direction along an inner periphery of the rotor. The stator has a laminated body composed by stacking sheet-like plates. A plurality of the sheet-like plates including an outermost layer of this laminated body comprises a flat portion substantially perpendicular to the magnet and an extended portion bent to a direction substantially parallel to the magnet. A part of the sheet-like plate having the extended portion disposed to the outermost side is formed into a thickness smaller than that of the other parts.

According to this structure, the part having the smaller thickness can reduce an eddy current and improve a driving efficiency. In the sheet-like plate having the extended portion disposed to the outermost side, the part having the smaller thickness exhibits a larger magnetic resistance. It thus averts magnetic flux of the magnet from concentrating into this sheet-like plate on the side close to the magnet, and rather helps the magnetic flux to spread to the other sheet-like plates. As a result, this structure ensures not to induce a large eddy current in the sheet-like plate on the side close to the magnet and avoids magnetic saturation. The structure can hence allow the magnetic flux to enter smoothly without increasing the magnetic resistance of the sheet-like plates as a whole.

According to one exemplary embodiment of the present invention, a motor is provided with sheet-like plates having extended portions, one of which disposed to the outermost side has a thickness smaller than that of other sheet-like plates laminated on the other side thereof in order to achieve the same effect as making the thickness of a part of the sheet-like plates disposed to the outermost side smaller than that of the other parts. It becomes possible by virtue of this structure to keep the eddy current small, thereby improving the driving efficiency.

In other words, there is a phenomenon in which magnetic flux of a large amount enters into the laminated sheet-like plates from one side of the extended portion confronting the magnet because of its close distance to the magnet. In the motor of the present invention, on the other hand, one of the sheet-like plates on the side confronting the magnet is formed smaller in the thickness than the other sheet-like plates laminated on the other side of this plate so as to increase the magnetic resistance. This structure thus averts the magnetic flux of the magnet from concentrating into the sheet-like plate on the side close to the magnet, and rather helps the magnetic flux to spread also to the sheet-like plates on the other side. Accordingly, this structure ensures not to induce a large eddy current in the sheet-like plate on the side close to the magnet and avoids magnetic saturation. It can hence allow the magnetic flux to enter smoothly without increasing the magnetic resistance of the sheet-like plates as a whole.

According to another exemplary embodiment of the present invention, a motor is provided with sheet-like plates having extended portions, one of which disposed to the outermost side has a boundary portion of a smaller thickness between a flat portion and an extended portion than that of the flat portion in order to achieve the same effect as making the thickness of a part of the sheet-like plates disposed to the outermost side smaller than that of the other parts. It also becomes possible by virtue of this structure to keep the eddy current small, thereby improving the driving efficiency.

That is, surfaces of the plurality of extended portions formed of the laminated sheet-like plates are covered with an insulation layer. Since the insulation layer prevents magnetic flux from crossing therethrough, the magnetic flux entering from the magnet in an orthogonal direction into the sheet-like plate on the side confronting the magnet is unable to flow into the next sheet-like plate. This can cause an eddy current to increase inside the sheet-like plate on the side confronting the magnet. In the motor of the present invention, on the other hand, one of the sheet-like plates having the extended portion disposed to the outermost side is provided with the boundary portion between the flat portion and the extended portion, wherein the boundary portion has the thickness smaller than that of the flat portion so as to increase the magnetic resistance in the curved portion. In other words, the high magnetic resistance at the boundary portion between the flat portion and the extended portion produces magnetic saturation to decrease a permeability in this portion to a level equal to or less than that of the insulation layer, thereby making the magnetic flux to flow rather easily into the next sheet-like plate having the extended portion disposed to the inner side. Accordingly, the structure can reduce the eddy current inside the extended portions as a whole, and hence improve the driving efficiency from this standpoint.

According to still another exemplary embodiment of the present invention, a motor is provided with sheet-like plates having extended portions, one of which disposed to the outermost side has the extended portion of a thickness smaller than that of the flat portion in order to achieve the same effect as making the thickness of a part of the sheet-like plates disposed to the outermost side smaller than that of the other parts. It also becomes possible by virtue of this structure to keep the eddy current small, thereby improving the driving efficiency.

That is, the laminated sheet-like plates are made of steel sheets, and the surfaces of which are coated with an insulation layer used as a protective coating. Since the insulation layer prevents magnetic flux from crossing therethrough, the magnetic flux entering from the magnet in an orthogonal direction into the sheet-like plate on the side confronting the magnet is unable to flow into the next sheet-like plate disposed at the inner side. This can cause an eddy current to increase inside the sheet-like plate on the side confronting the magnet. In the motor of the present invention, on the other hand, one of the sheet-like plates having the extended portion disposed to the outermost side (i.e., closest to the magnet) is so formed that the extended portion has the thickness smaller than that of the flat portion. In other words, the sheet-like plate having the thin extended portion disposed to the outermost side can produce magnetic saturation with a small amount of magnetic flux, and decrease permeability in this portion to a level equal to or less than that of the insulation layer. This helps the magnetic flux to flow rather easily from the sheet-like plate having the extended portion disposed to the outermost side into the next sheet-like plate having the extended portion disposed to the inner side. Accordingly, this structure can reduce the eddy current inside the extended portions as a whole, and hence improve the driving efficiency from this standpoint.

DETAILED DESCRIPTION OF THE PREFERRED EMBODIMENTS

Description will be provided hereinafter of exemplary embodiments of the present invention with reference to the accompanying drawings.

First Exemplary Embodiment

Figure 1:
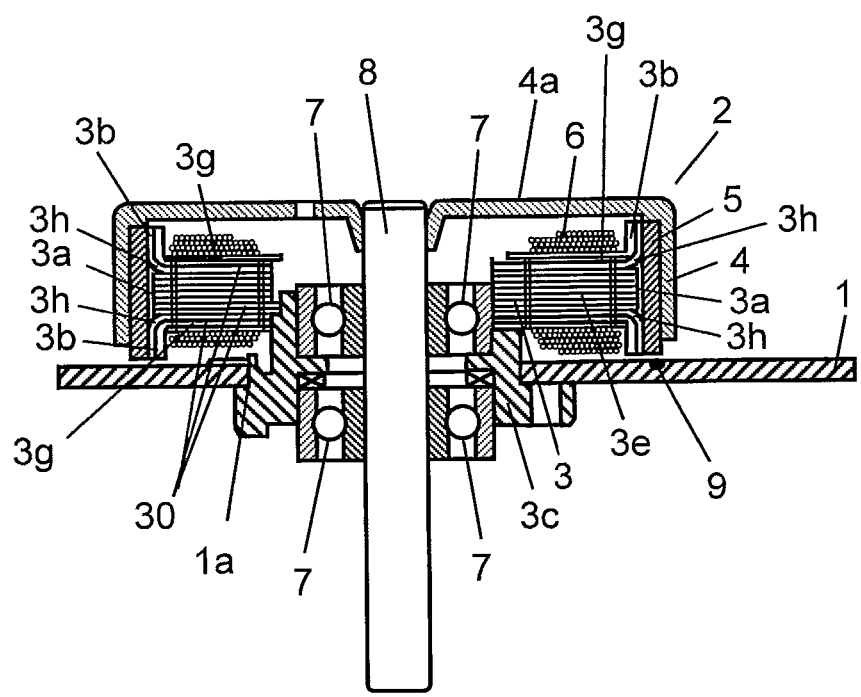
FIG. 1 is a cross sectional view showing a motor according to a first exemplary embodiment of the present invention.
Figure 2:
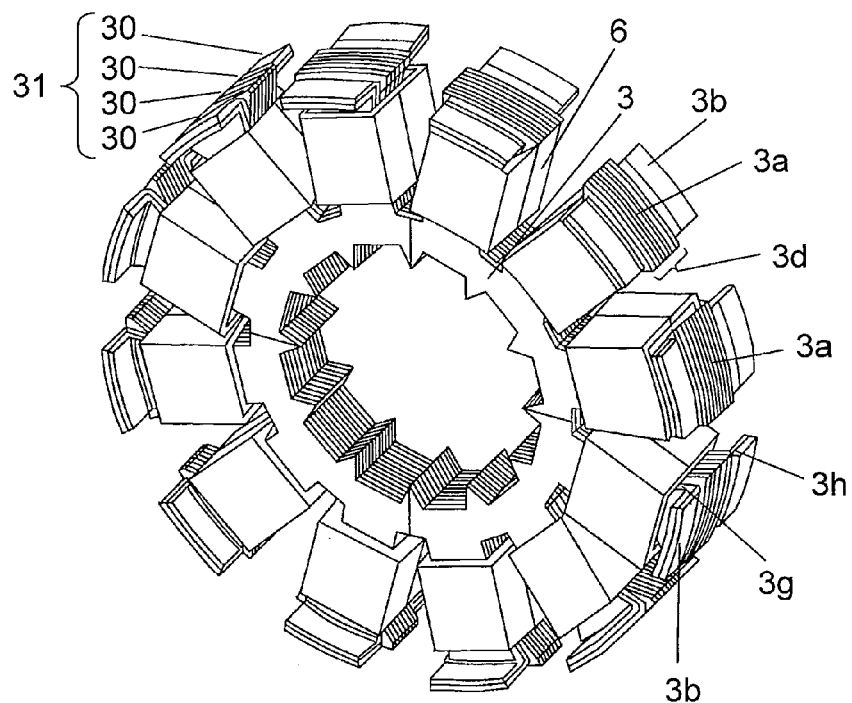
FIG. 2 is a perspective view showing a stator which composes the motor of the first exemplary embodiment of the present invention.

FIG. 1 is a cross sectional view showing a motor according to the first exemplary embodiment of the present invention. FIG. 2 is a perspective view showing a stator which composes the motor of the first exemplary embodiment of this invention.

As shown in FIG. 1, motor 2 is mounted on wiring board 1, which is disposed inside a main unit casing (not shown) of an electronic device (a laser printer, for instance).

Motor 2 comprises stator 3 having laminated body 31 formed by stacking sheet-like plates 30, and rotor 4 disposed in a rotatable manner around the outer periphery of stator 3 as shown in FIG. 1 and FIG. 2. Rotor 4 is cylindrical in shape with an opening in the bottom. Rotor 4 is provided with magnet 5 of an annular shape fixed to an inner periphery thereof, wherein magnet 5 has N-poles and S-poles magnetized alternately (i.e., different polarities next to one another) at regular intervals determined according to a number of the poles. Stator 3 has a plurality of magnetic poles 3a disposed along an outer periphery thereof at regular intervals determined according to the number of the poles as shown in FIG. 2. Each of magnetic paths 3e at the inner side of magnetic poles 3a has coil 6 wound around it for electro-magnetization.

The individual magnetic poles 3a are magnetized to become N- and S-poles alternately by ac power applied to coils 6, which in turn produce an attractive force and a repulsive force with respect to magnet 5 located at the outer periphery of magnetic poles 3a to exert a rotational driving force on rotor 4.

Stator 3 is fixed to wiring board 1 by using retainer 3c. A plurality of bearings 7 are disposed to an inner surface of stator 3, and drive shaft 8 is inserted vertically through the plurality of bearings 7. A top end of this drive shaft 8 is fixed to top plate 4a of rotor 4.

When ac power is applied to coils 6 to magnetize the individual magnetic poles 3a alternately to have N- and S-polarities, they produce an attractive force and a repulsive force between magnetic poles 3a and magnet 5 to rotate rotor 4 around drive shaft 8. A force of this rotation is then transmitted to paper feed rollers via drive shaft 8.

According to this exemplary embodiment, to be more specific, a bottom end of drive shaft 8 penetrates through-hole 1a of wiring board 1 and extends below wiring board 1. The bottom end of drive shaft 8 has a gear (not shown) attached thereto, and a gearbox (not shown) is linked to the gear. The above mechanism rotates a plurality of paper feed rollers (not shown) for feeding paper.

Also provided is Hall IC 9 mounted on an upper surface (or on a lower surface) of wiring board 1 in a position corresponding to the bottom side of magnet 5. Hall IC 9 functions as a magnetic sensing element for sensing a speed and an amount of rotation (or position) of rotor 4 to control a number of rotations as is well known.

Magnet 5 is so shaped that the bottom side extends near Hall IC 9 to keep it as close to Hall IC 9 as practically possible. The top side of magnet 5 is also extended to the same extent as the bottom side in order to avoid a problem of loosing of the balance of magnet 5 with respect to stator 3 that can otherwise result if only the bottom side is extended.

Because the dimension of magnet 5 is increased in its vertical direction, the individual magnetic poles 3a of stator 3 in this exemplary embodiment are each provided with integrally-formed extended portions 3b extended vertically from magnetic polar base 3d in a direction generally parallel to the inner periphery of magnet 5 to proportionate their dimensions to that of magnet 5, as shown in FIG. 1 and FIG. 2. In other words, extended portions 3b are extended individually from both the top and bottom of magnetic polar base 3d in the direction generally parallel to the longitudinal axis of drive shaft 8 so that they confront magnet 5 in substantially parallel to a plane generally perpendicular to an orientation of the magnetic pole.

To be concrete, these extended portions 3b are formed by bending outer peripheral edges of pluralities of sheet-like plates 30 including the upper and lower sides of outermost layers amongst the plurality of stacked sheet-like plates 30 that constitute stator 3 into substantially right angles to both upward and downward in the direction substantially parallel to the inner periphery of magnet 5.

In any of sheet-like plates 30 having extended portion 3b, a part other than extended portion 3b is designated as flat portion 3g, and of one sheet-like plate 30 having extended portion 3b on the outermost side closest to magnet 5, the boundary between extended portion 3b and flat portion 3g is designated as boundary portion 3h. This exemplary embodiment shows an example in which extended portions 3b are formed by bending two layers of sheet-like plates 30. In the description provided hereinafter, therefore, one of extended portions 3b on the outermost side confronting closer to magnet 5 may be called outermost-side extended portion 3ba, and the other extended portion 3b on the inner side of outermost-side extended portion 3ba may be called inner-side extended portion 3bb as appropriate. In addition, sheet-like plate 30 having outermost-side extended portion 3ba may be called outermost-side sheet-like plate 30a, and sheet-like plate 30 having inner-side extended portion 3bb may be called inner-side sheet-like plate 30b.

Extended portions 3b formed in the above manner can increase their surfaces that confront vertically extended magnet 5, as shows in FIG. 1, to increase an amount of the magnetic flux entering from magnet 5 and to exert a large driving force on rotor 4.

Description is provided next of further details of stator 3 of motor 2 constructed as above.

Figure 3:
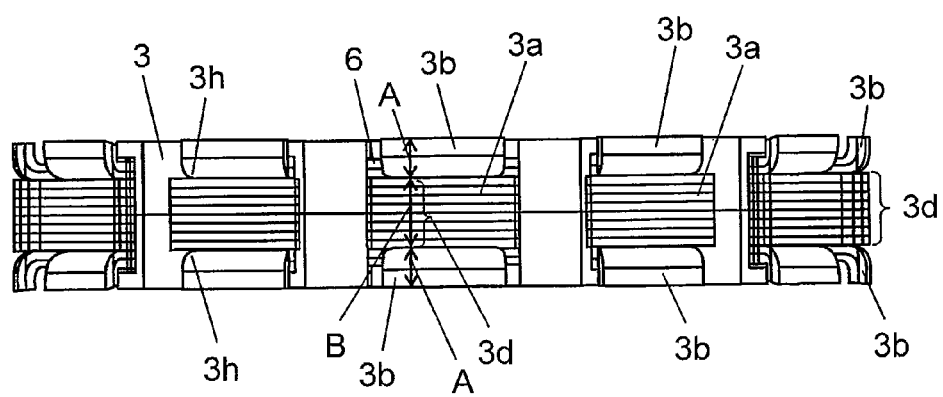
FIG. 3 is a side view of the stator shown in FIG. 2.
Figure 4:
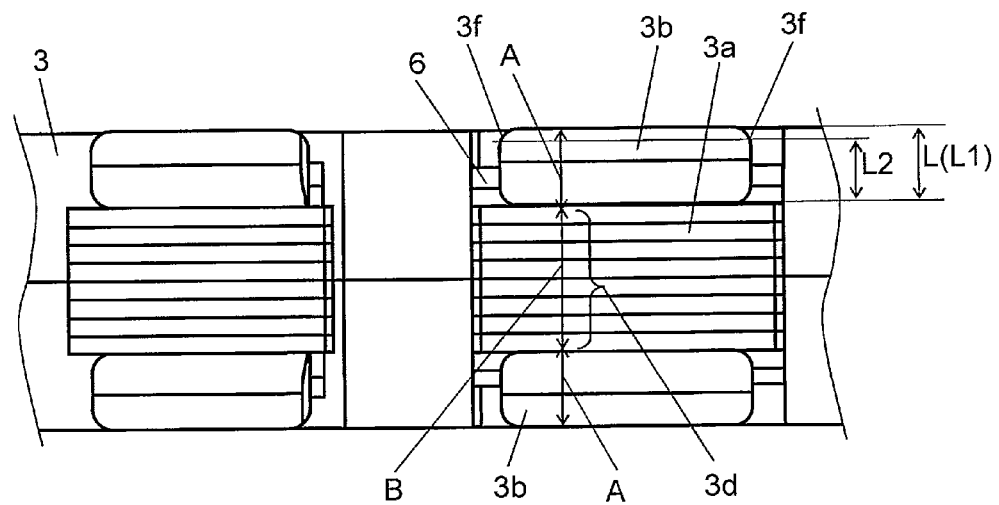
FIG. 4 is an enlarged view of a part of the stator in FIG. 3.

FIG. 3 is a side view of stator 3 shown in FIG. 2, and FIG. 4 is an enlarged view of a part of FIG. 3. The details of stator 3 are described hereinafter by referring to FIG. 3 and FIG. 4.

First of all, it is desirable that a total length of extended portions 3b extended to both upward and downward in the direction generally parallel to the inner periphery of magnet 5 shown in FIG. 3 (i.e., A+A in FIG. 3) is set not to exceed a length of magnetic polar base 3d in the direction generally parallel to the inner periphery of magnet 5 (i.e., B in FIG. 3).

The reason of this is as follows.

An amount of the magnetic flux entering from magnet 5 increases with increase in the length (A+A) of extended portions 3b extended to both upward and downward in the direction generally parallel to the inner periphery of magnet 5. This results in the possibility of causing magnetic saturation in magnetic path 3e at the inner side of each magnetic pole 3a where electromagnetic coil 6 is wound. If such magnetic saturation occurs, it becomes impossible to increase the rotational torque of rotor 4 in proportion to an increase in power applied to coil 6. A result of this is the motor of poor driving efficiency. It is therefore desirable to make the length (A+A) of extended portions 3b extended to both upward and downward in the direction generally parallel to the inner periphery of magnet 5 not to exceed the length B.

It is also desirable to round off both side corners at the ends of extended portions 3b to form curved surfaces 3f having a rounded shape as shown in FIG. 4. That is, provision of curved surfaces 3f at the both side ends of extended portions 3b having extending length L shortens extending length L2 at both side ends in the circumferential direction as compared to extending length L1 at the center portions of extended portions 3b as shown in FIG. 4. The purpose of it is to avoid a problem of magnetic saturation that can occur in magnetic circuits communicating with magnetic poles 3a due to the magnetic flux entering through extended portions 3b. Details of this problem are discussed next.

As illustrated in FIG. 1 and FIG. 2, coils 6 are wound around magnetic paths 3e located at the inner side of magnetic poles 3a of stator 3. It is therefore necessary to make a sectional area of magnetic paths 3e smaller in part where coils 6 are wound than the other parts of magnetic poles 3a. When magnetic flux enters through magnetic poles 3a of the larger sectional area than that of magnetic paths 3e and concentrates into magnetic paths 3e, magnetic saturation is likely to occur in magnetic paths 3e. Curved surfaces 3f of the rounded shape are therefore formed on the both side corners at the ends of extended portions 3b to make the side portions of extended portion 3b shorter than the center portions so as to guide the magnetic flux to enter mostly through the center areas of extended portions 3b. The above structure can hence avoid the magnetic flux from saturating inside magnetic paths 3e to improve the driving efficiency.

Moreover, curved surfaces 3f formed on the both side corners at the ends of extended portions 3b can prevent coils 6 and a nozzle used for winding coils 6 around magnetic paths 3e from coming in contact with the corner edges of extended portions 3b. They can hence avoid problems such as damages to the coating and breaking of coils 6 due to their contact with the corner edges, thereby improving the productivity.

Although the description provided above is of curved surfaces 3f on both side corners at the ends of extended portions 3b, they may be of any other shape that can decrease the length of the both sides of extended portions 3b smaller than that of the center portion such as chamfers formed by diagonally cutting the corner edges.

It is considered that the larger a volume of extended portions 3b the larger an amount of the magnetic flux it receives from magnet 5. An amount of the eddy-current loss increases, on the other hand, when the thickness of the individual sheet-like plates 30 is increased in an attempt to increase the amount of the magnetic flux. This is because the magnetic flux imparted by magnet 5 to the entire surfaces of extended portions 3b is in the direction orthogonal to the surfaces of extended portions 3b. In other words, there is the need to take such measures as reducing the thickness of each of sheet-like plates 30 that form extended portions 3b to curtail the eddy-current loss.

In order to curtail the eddy-current loss, this exemplary embodiment employs a structure wherein a part of sheet-like plates 30 having extended portions 3b disposed to the outermost side is formed into a thickness smaller than that of the other parts. According to this exemplary embodiment, in particular, those sheet-like plates 30 having extended portions 3b on the side confronting magnet 5 are formed smaller in their thickness than the other sheet-like plates 30 laminated on the other side thereof, so as to further improve the driving efficiency. In other words, outermost-side sheet-like plates 30a having extended portions 3b on the outermost side are formed smaller in their thickness than inner-side sheet-like plates 30b having extended portions 3b on the inner side, for further improvement of the driving efficiency.

Figure 5:
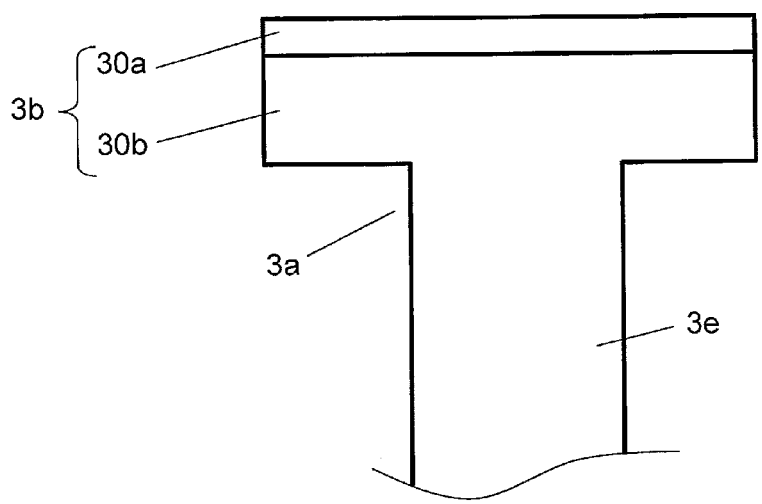
FIG. 5 is an enlarged top view of a magnetic pole of the stator according to the first exemplary embodiment of the present invention.
Figure 6:
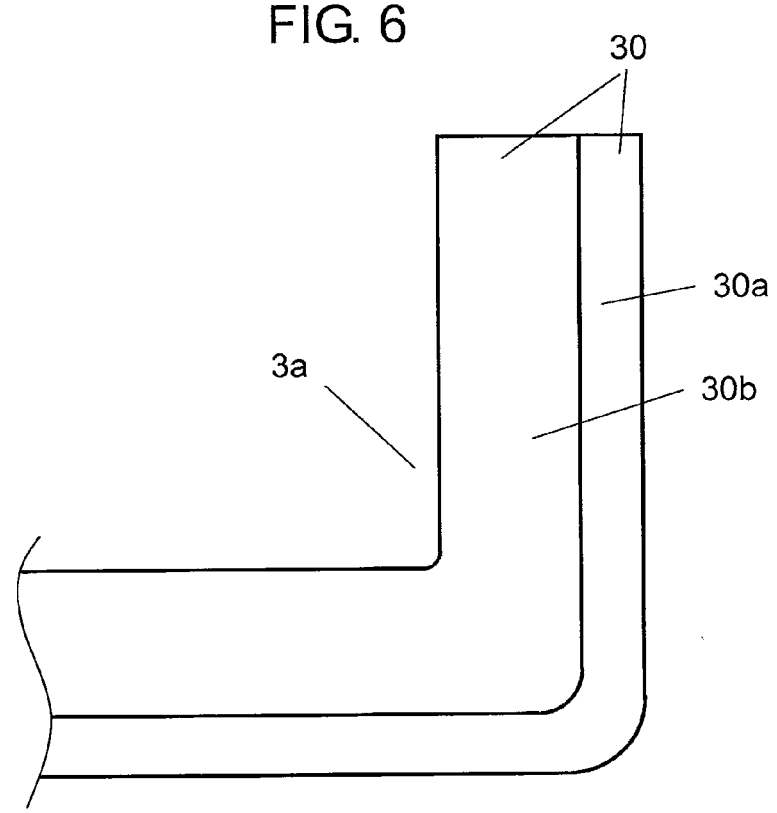
FIG. 6 is an enlarged side view of the magnetic pole of the stator according to the first exemplary embodiment of the present invention.

FIG. 5 is an enlarged top view of magnetic pole 3a of stator 3 according to this exemplary embodiment, and FIG. 6 is an enlarged side view of the same. As shown in FIG. 5 and FIG. 6, extended portions 3b are formed of laminated sheet-like plates 30, and one of sheet-like plates 30 on the side confronting magnet 5, or outermost-side sheet-like plate 30a has a smaller thickness than that of the other of laminated sheet-like plates 30, or inner-side sheet-like plate 30b.

That is, the magnetic flux of a large amount is inevitable to flow through outermost-side sheet-like plate 30a confronting magnet 5 in extended portion 3b formed of laminated sheet-like plates 30 because of its close distance to magnet 5. In this exemplary embodiment, therefore, a magnetic resistance of outermost-side sheet-like plate 30a is increased by reducing its thickness smaller than that of inner-side sheet-like plate 30b.

On the other hand, inner-side sheet-like plate 30b has a smaller magnetic resistance since its thickness is larger than that of outermost-side sheet-like plate 30a.

This structure can thus help the magnetic flux from magnet 5 to spread to inner-side sheet-like plate 30b while averting it from concentrating into outermost-side sheet-like plate 30a. As a result, the structure ensures not to induce a large eddy current or magnetic saturation inside outermost-side sheet-like plate 30a. The structure also allows the magnetic flux to enter smoothly without increasing the magnetic resistance of the sheet-like plates as a whole, and it can thereby improve the driving efficiency as a result of all of the above.

Figure 7:
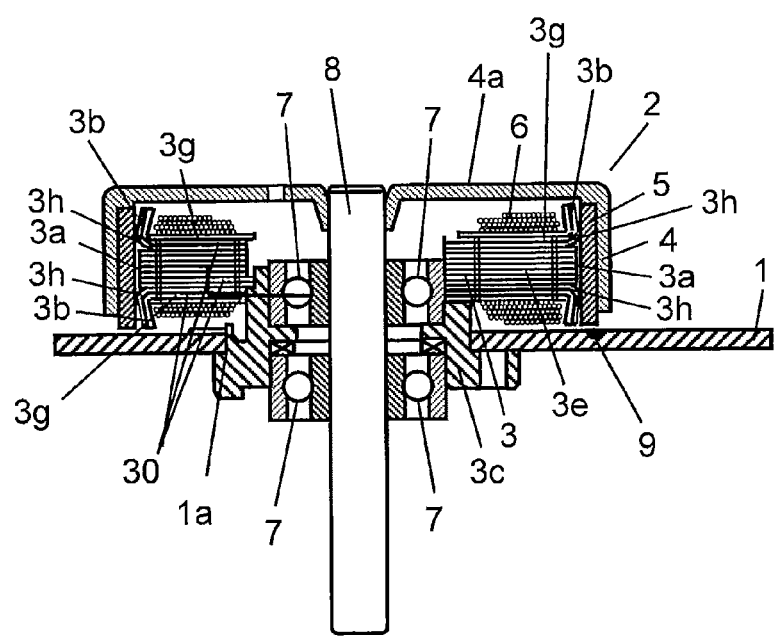
FIG. 7 is a schematic drawing showing an example configuration wherein extended portions are so bent as to shift their tip ends further inward of the stator than bent portions.

Although what has been described above is one sample of providing extended portions 3b extended from magnetic polar base 3d in a direction generally parallel to the inner periphery of magnet 5, extended portions 3b may be bent further by increasing their bent angles so that the tip ends of extended portions 3b point inward of stator 3 from the bent portions. That is, extended portions 3b may be so configured that gaps between extended portions 3b and magnet 5 become larger at their tip ends than at their bent portions. FIG. 7 is a schematic drawing showing an example configuration wherein extended portions 3b are so bent as to shift their tip ends further inward of stator 3 than the bent portions. This structure is intended to prevent extended portions 3b from coming in contact with magnet 5 during rotation of rotor 4 in case extended portions 3b become deformed due to some stresses exerted upon them in the long term of use. There exist some cases of designing as small a gap as 0.3 mm between the inner surface of magnet 5 of rotor 4 and magnetic poles 3a of stator 3. If this is the case, it is especially preferable to increase the bending angle of extended portions 3b to such an extent that the tip ends of extended portions 3b are slanted further inward of stator 3 from the bent portions to prevent extended portions 3b from coming in contact with magnet 5.

In this exemplary embodiment, extended portions 3b have been illustrated as being formed by bending two layers of sheet-like plates 30 on both the upper and lower sides, including the outermost layer. However, the number of layers of sheet-like plates 30 may be changed such that extended portions 3b can be formed by bending three or more layers of sheet-like plates 30 on both the upper and lower sides including the outermost layer. It is necessary even in this case that thinnest sheets are used for those sheet-like plates 30 that confront magnet 5, or outermost-side sheet-like plates 30a, amongst those sheet-like plates 30 composing extended portions 3b. If three or more layers are provided, it is desirable to reduce their thicknesses gradually from the ones at the stator 3 side toward the others confronting magnet 5.

According to this exemplary embodiment of the invention, as discussed above, a part of sheet-like plates 30 having extended portions 3b disposed to the outermost side is formed into a thickness smaller than that of the other parts. More specifically, those sheet-like plates 30 having extended portions 3b on the side confronting magnet 5 are formed smaller in their thickness than the other sheet-like plates 30 laminated on the other side thereof, so as to improve the driving efficiency of the motor.

This structure may be used in combination with various other features mentioned above such as curved surfaces 3f to achieve further improvement of the driving efficiency.

Second Exemplary Embodiment

Figure 8:
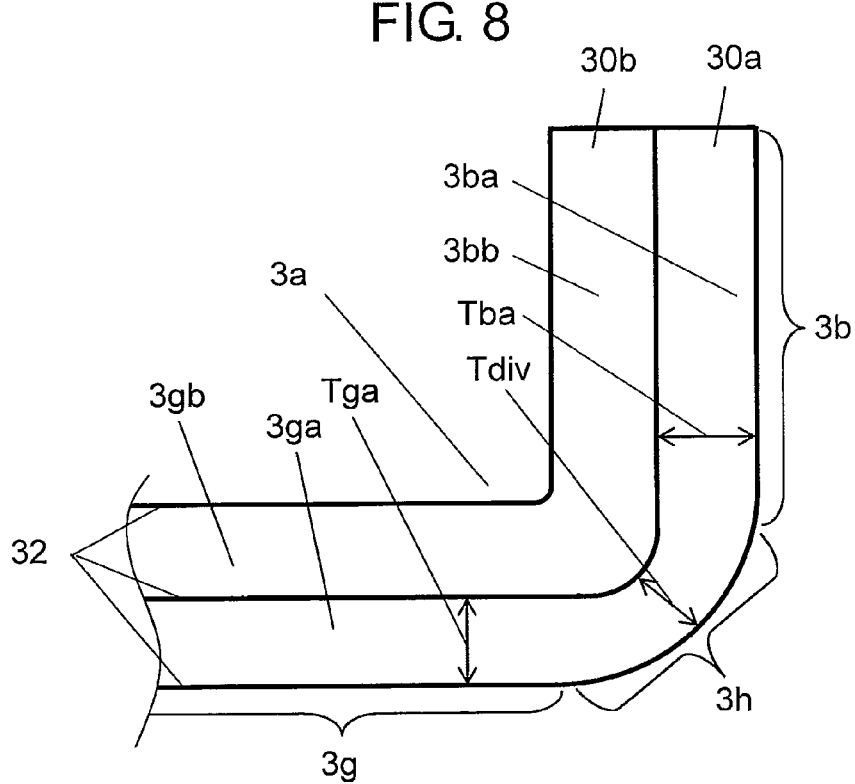
FIG. 8 is an enlarged side view of magnetic pole 3a of stator 3 according to a second exemplary embodiment of the present invention.
Figure 9:
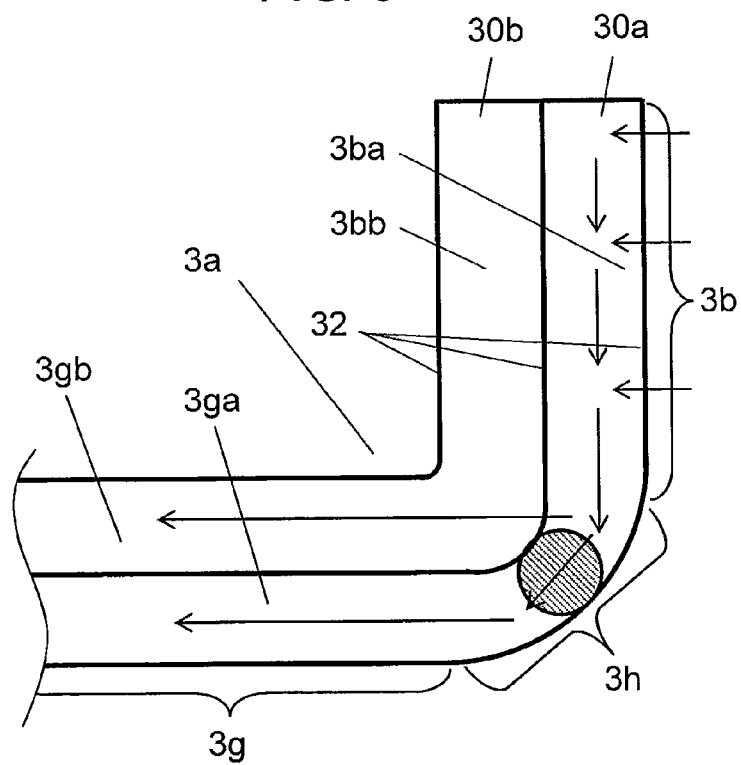
FIG. 9 is an explanatory drawing of magnetic pole 3a of stator 3 according to the second exemplary embodiment of the present invention.

FIG. 8 is an enlarged side view of magnetic pole 3a of stator 3 according to the second exemplary embodiment of the present invention, and FIG. 9 is an explanatory drawing of magnetic pole 3a of stator 3 in this exemplary embodiment. A general structure of a motor of this exemplary embodiment is similar to that of the first exemplary embodiment, and details of it are therefore skipped.

In this exemplary embodiment, a part of sheet-like plates 30 having extended portions 3b disposed to the outermost side is formed into a thickness smaller than that of the other parts. In comparison with the first exemplary embodiment, a peculiar point of this exemplary embodiment is that sheet-like plate 30 having outermost-side extended portion 3ba, or outermost-side sheet-like plate 30a, has a magnetic flux impeding section, which is formed with boundary portion 3h, between flat portion 3g and extended portion 3b, where the thickness is reduced smaller than that of flat portion 3g. Description is now provided of a structure of magnetic poles 3a of the motor according to this exemplary embodiment.

As shown in FIG. 8 and FIG. 9, each of sheet-like plates 30 having extended portions 3b comprises flat portion 3g, extended portion 3b and boundary portion 3h between them.

In motor 2 of this exemplary embodiment, the magnetic flux impeding section, which is formed with boundary portion 3h, between flat portion 3ga and outermost-side extended portion 3ba of outermost-side sheet-like plate 30a, has a thickness thinner than thickness Tba of outermost-side extended portion 3ba and thickness Tga of flat portion 3ga, as shown in FIG. 8, wherein the thinnest point of the magnetic flux impeding section has a thickness Tdiv. Here in FIG. 8 and FIG. 9, a flat portion denoted as 3ga is flat portion 3g of outermost-side sheet-like plate 30a, and another flat portion denoted as 3gb is flat portion 3g of inner-side sheet-like plate 30b.

Furthermore, arrows in FIG. 9 indicate the routes where the magnetic flux passes through in sheet-like plates 30. The individual sheet-like plates 30 are provided with insulation layer 32 formed on their surfaces. Therefore, the magnetic flux entering from magnet 5 into outermost-side extended portion 3ba amongst extended portions 3b flows inside the same sheet-like plate 30 since insulation layer 32 prevents the magnetic flux from crossing therethrough into the adjoining sheet-like plate 30.

In this exemplary embodiment, therefore, thickness Tdiv of boundary portion 3h of outermost-side sheet-like plate 30a is formed thinner than thickness Tba of outermost-side extended portion 3ba and thickness Tga of flat portion 3ga, so as to provide it with the effect of impeding the magnetic flux. The above structure helps most of the magnetic flux passing through outermost-side extended portion 3ba to move into inner-side sheet-like plate 30b since the magnetic flux in outermost-side extended portion 3ba is unable to flow freely inside the same sheet-like plate 30.

As described above, the magnetic flux passed through outermost-side extended portion 3ba would not enter inner-side sheet-like plate 30b if there was no magnetic flux impeding section, or thickness Tdiv of the boundary portion 3h was equal to or larger than thickness Tba of outermost-side extended portion 3ba and thickness Tga of flat portion 3ga. If the magnetic flux does not enter inner-side sheet-like plate 30b, the presence of inner-side sheet-like plate 30b has no effect. On the other hand, if the magnetic flux impeding section is provided as illustrated in this exemplary embodiment, the magnetic flux passed through outermost-side extended portion 3ba enters inner-side sheet-like plate 30b. It thus becomes possible by virtue of the structure of this exemplary embodiment to make use of inner-side sheet-like plate 30b effectively.

It is more desirable to make the thickness of outermost-side sheet-like plate 30a thinner than the thickness of inner-side sheet-like plate 30b like that of the first exemplary embodiment. Such a structure can further reduce the eddy-current loss in outermost-side sheet-like plate 30a.

Illustrated in this exemplary embodiment is also an example, in which extended portions 3b are formed by bending two layers of sheet-like plates 30. However, the number of layers of sheet-like plates 30 may be changed such that extended portions 3b can be formed of three or more layers of sheet-like plates 30 rather than limiting them to two layers, as has been described in the first exemplary embodiment.

This structure may also be used in combination with various other features described in the first exemplary embodiment to achieve further improvement of the driving efficiency.

Third Exemplary Embodiment

Figure 10:
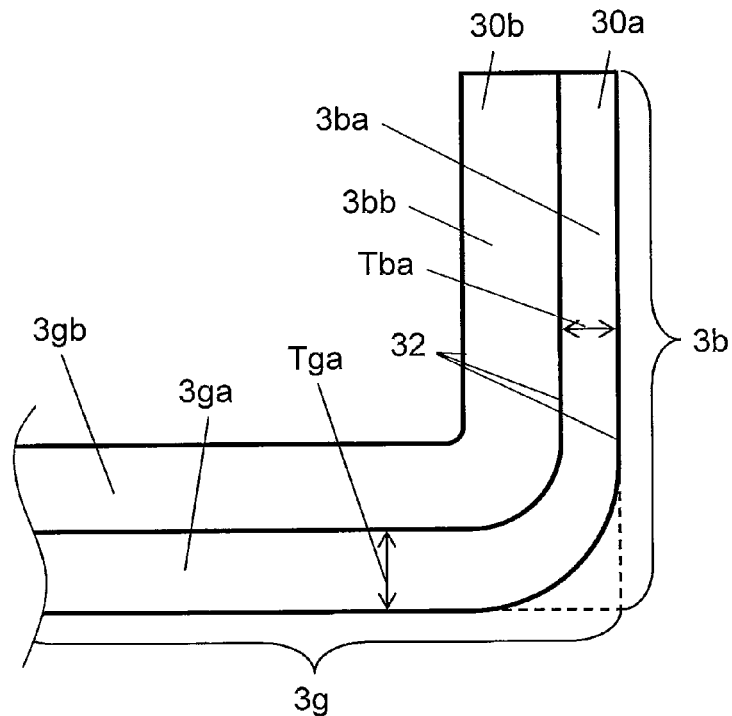
FIG. 10 is an enlarged side view of a sheet-like plate including an extended portion of a magnetic pole according to a third exemplary embodiment of the present invention.
Figure 11:
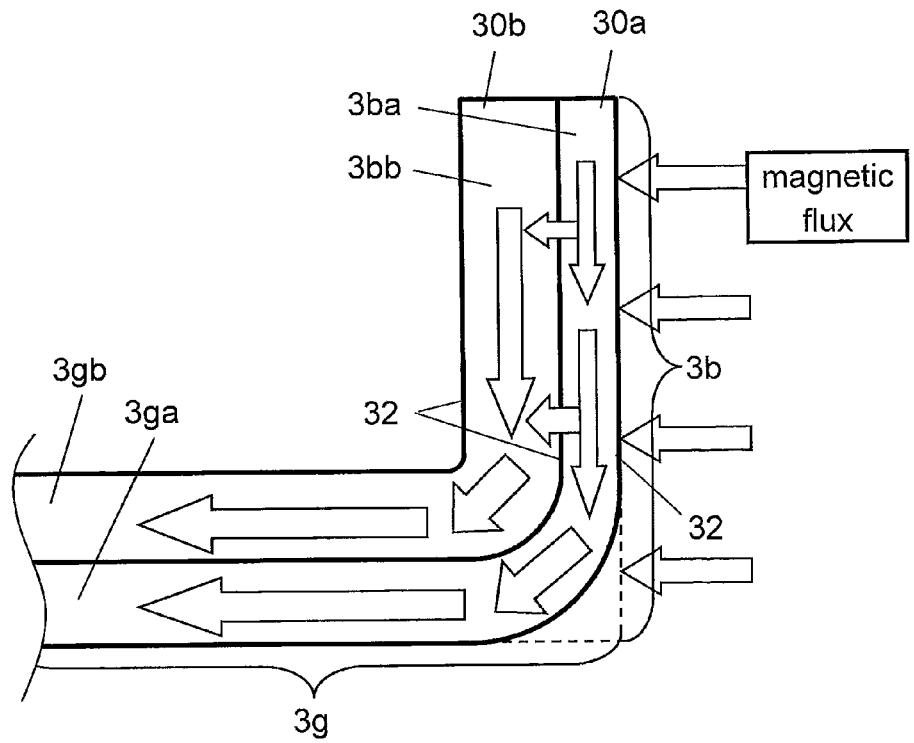
FIG. 11 is an explanatory drawing of the sheet-like plate including the extended portion of the magnetic pole according to the third exemplary embodiment of the present invention.

FIG. 10 is an enlarged side view of sheet-like plates 30 including extended portion 3b of magnetic pole 3a according to the third exemplary embodiment of the present invention, and FIG. 11 is an explanatory drawing of sheet-like plates 30 including extended portion 3b of magnetic pole 3a according to this exemplary embodiment. Since a general structure of a motor of this third exemplary embodiment is similar to those of the first and the second exemplary embodiments, details of it are skipped.

In this exemplary embodiment, a part of sheet-like plates 30 having extended portions 3b disposed to the outermost side is also formed into a thickness smaller than that of the other parts. In comparison with the first exemplary embodiment, a peculiar point of this exemplary embodiment is that at least outermost-side extended portion 3ba of at least one of sheet-like plates 30 having extended portion 3b, i.e., outermost-side sheet-like plate 30a, has a thickness smaller than that of the flat portion. Description is provided hereinafter of a structure of magnetic poles 3a of the motor according to this exemplary embodiment.

As shown in FIG. 10 and FIG. 11, extended portion 3b comprises flat portion 3g and extended portion 3b of sheet-like plate 30.

In motor 2 of this exemplary embodiment, outermost-side extended portion 3ba of outermost-side sheet-like plate 30a has thickness Tba smaller than thickness Tga of flat portion 3ga, as shown in FIG. 10.

Furthermore, arrows in FIG. 11 indicate the routes where the magnetic flux passes through in sheet-like plates 30. The individual sheet-like plates 30 are provided with insulation layer 32 formed on their surfaces. Therefore, the magnetic flux entering from magnet 5 into outermost-side sheet-like plate 30a saturates immediately and flows into the adjoining sheet-like plate 30. As a result, this structure ensures not to induce a large eddy current in outermost-side sheet-like plate 30a. In addition, the structure decreases a magnetic resistance of the sheet-like plates as a whole, allows the magnetic flux to enter smoothly, and it can thereby improve the driving efficiency.

It is desirable here to reduce the thickness of outermost-side sheet-like plate 30a smaller than that of inner-side sheet-like plate 30b in the like manner as the first exemplary embodiment, so as to reduce the eddy-current loss in the outermost-side sheet-like plate 30a entirely.

In this exemplary embodiment, only a part of inner-side sheet-like plate 30b is bent first to form inner-side extended portion 3bb, and outermost-side extended portion 3ba is then fabricated by a process of drawing while outermost-side sheet-like plate 30a is stacked to inner-side sheet-like plate 30b.

Description is provided here of the reason of using the drawing process on the part to form outermost-side extended portion 3ba.

Figure 12:
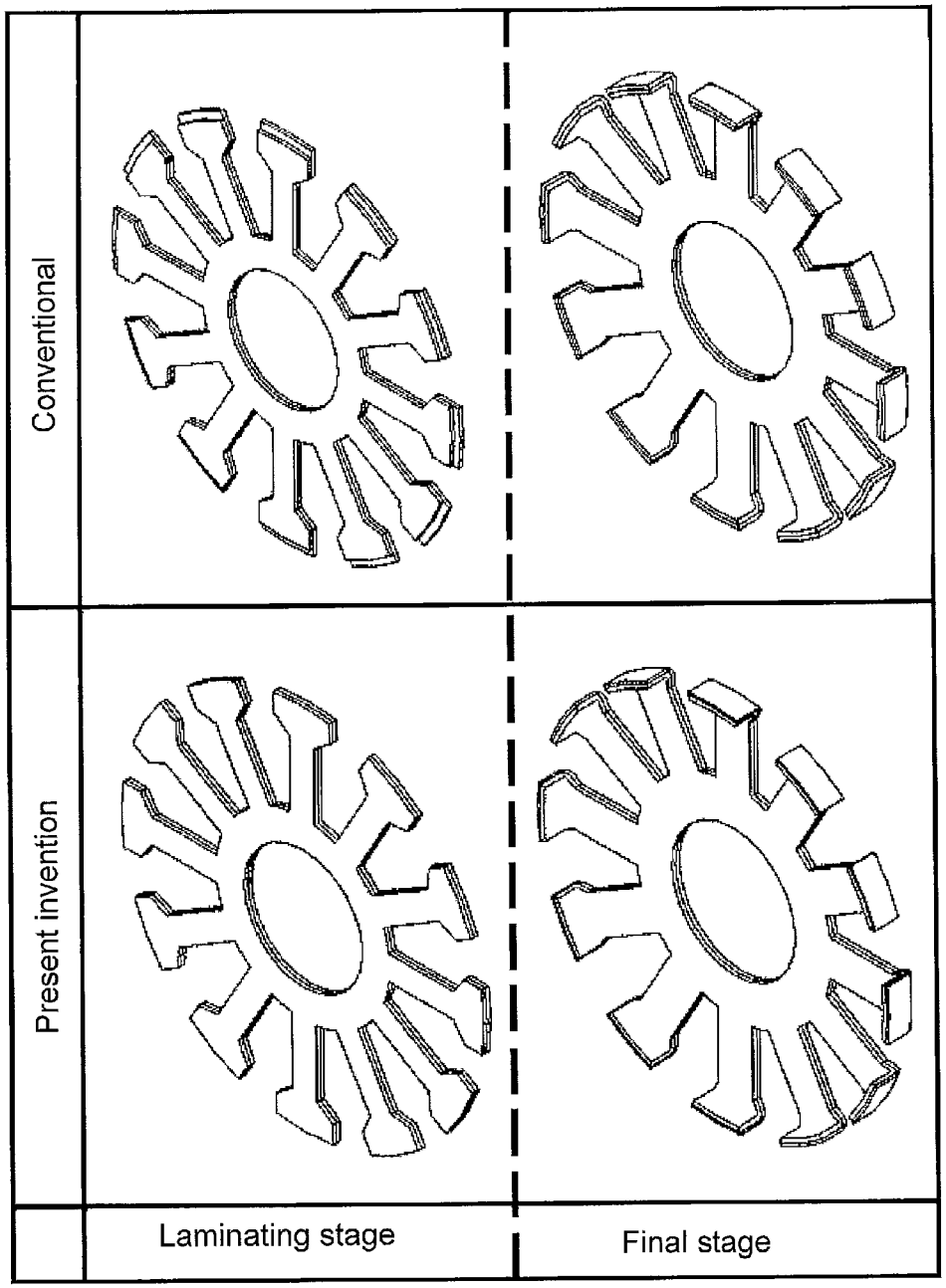
FIG. 12 is a comparative illustration showing the sheet-like plate of the third exemplary embodiment of the present invention and a conventional sheet-like plate in their laminating stage and final stage of forming extended portions.

FIG. 12 is a comparative illustration showing sheet-like plate 30 of the present invention and a conventional sheet-like plate in their laminating stage and final stage of forming extended portions 3b.

Of two sheet-like plates 30 forming extended portions 3b of the conventional product, it was necessary to make one of sheet-like plates 30 forming outermost-side extended portions 3ba larger in size than the other sheet-like plate 30 forming inner-side extended portions 3bb, in order to form outermost-side extended portions 3ba and inner-side extended portions 3bb of the same height. This had been the cause of high manufacturing cost since punching dies of different sizes were needed to fabricate sheet-like plate 30 forming outermost-side extended portions 3ba and sheet-like plate 30 forming inner-side extended portions 3bb.

On the other hand, the present invention allows use of outermost-side sheet-like plate 30a and inner-side sheet-like plate 30b of equal size to obtain outermost-side extended portions 3ba and inner-side extended portions 3bb of the same height. This is because the process of drawing can expand outermost-side sheet-like plate 30a to compensate for an extra length lost in the bent portion of outermost-side sheet-like plate 30a. It thus makes possible to use the same single die to fabricate both outermost-side sheet-like plate 30a and inner-side sheet-like plate 30b, so as to help reduce the manufacturing cost.

In the case of the conventional product, the magnetic flux entered from magnet 5 into outermost-side sheet-like plate 30a does not saturate in outermost-side extended portion 3ba, and therefore not flow into inner-side sheet-like plate 30b since outermost-side extended portion 3ba has generally the same thickness as that of flat portion 3g. This produces a large eddy current in outermost-side sheet-like plate 30a, increases a magnetic resistance in all, and it hence prevents the magnetic flux from entering smoothly. As a result, it is not feasible to make any improvement of the driving efficiency.

On the contrary, outermost-side extended portion 3ba of the present invention is formed thinner than flat portion 3g. The magnetic flux entered from magnet 5 into outermost-side sheet-like plate 30a is therefore saturated quickly inside outermost-side extended portion 3ba, and moves into inner-side extended portion 3bb as indicated by the arrows in FIG. 11. This reduces the eddy current produced in outermost-side sheet-like plate 30a, decreases a magnetic resistance in all, and helps the magnetic flux to enter smoothly. As a result, it improves the driving efficiency.

This exemplary embodiment also illustrates an example, in which extended portions 3b are formed by bending two layers of sheet-like plates 30. However, the number of layers of sheet-like plates 30 may be changed such that extended portions 3b be formed of three or more layers of sheet-like plates 30 rather than limiting them to two layers, as described in the first exemplary embodiment.

This structure may also be used in combination with various other features described in the first exemplary embodiment to achieve further improvement of the driving efficiency.

Fourth Exemplary Embodiment

Figure 13:
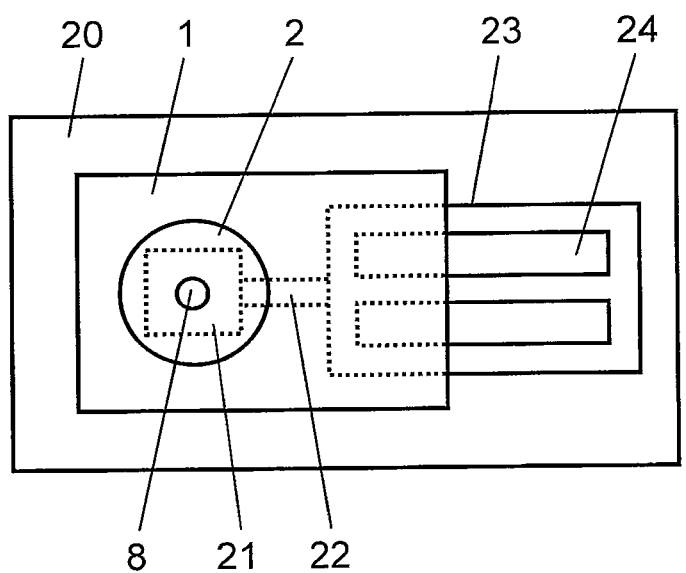
FIG. 13 is an explanatory drawing of an electronic device according to a fourth exemplary embodiment of the present invention.

FIG. 13 is an explanatory drawing of an electronic device (a laser printer for example) according to the fourth exemplary embodiment of the present invention. This electronic device is provided with motor 2 of one of the first to the third exemplary embodiments.

In FIG. 13, motor 2 illustrated in FIG. 1 is mounted on wiring board 1 together with other electronic components (not shown) necessary for overall function of the electronic device.

A bottom end of drive shaft 8 penetrates through-hole 1a (shown in FIG. 1) of wiring board 1, and extends under wiring board 1, where gearbox 21 is linked to the bottom end of this drive shaft 8. Gearbox 21 reduces a rotating speed of motor 2. A rotational driving force of motor 2 is transmitted via coupling mechanism 22 to driven unit 23 including a plurality of paper feed rollers 24. The plurality of paper feed rollers 24 are thus rotated to carry out the paper feeding operation.

It becomes possible by virtue of this exemplary embodiment to improve a driving efficiency of the electronic device, thereby achieving a high efficiency and low power consumption.

INDUSTRIAL APPLICABILITY

According to the present invention, it becomes possible to improve driving efficiency of motors, which can hence contribute to improvement of the efficiency of various electronic devices.

The invention claimed is:

1. A motor comprising:
a stator having a plurality of magnetic poles disposed in a circumferential direction along an outer periphery thereof;
a rotor disposed rotatably around the outer periphery of the stator; and
a magnet disposed in a circumferential direction along an inner periphery of the rotor, wherein:
the stator has a laminated body formed with sheet-like plates laminated in an axial direction;
sheet-like plates of the laminated body located on one axially outermost side comprise a flat portion substantially perpendicular to the axial direction, an extended portion extending outwardly in substantially parallel to the axial direction and a boundary portion connecting the flat and extended portions, wherein the extended portion is formed with two or more sheet-like plates laminated together on the one axially outermost side which terminate correspondingly with each other; and
the outermost sheet-like plate of the sheet-like plates comprises a magnetic flux impeding section made thinner than a remaining section of the outermost sheet-like plate, wherein the magnetic flux impeding section is extensive with the boundary portion.

2. The motor of claim 1, wherein the sheet-like plates are formed by a process of drawing.

3. The motor claim 1, wherein the sheet-like plates of the laminated body located on the other axially outermost side have an extended portion extending outwardly in substantially parallel to the axial direction, and a total axial length of the extended portions on the axially outermost sides is shorter than an axial length of the laminated body excluding thicknesses of the one sheet-like plates located on the axially outermost sides.

4. The motor of claim 3, wherein the extended portion is provided with curved corners at its terminal end.

5. The motor of claim 3, wherein the extended portion is provided with corners at its terminal end which are cut diagonally.

6. The motor of claim 1, wherein the extended portion is provided on both of axial sides of a magnetic polar base, and a total axial length of the extended portions is set not to exceed an axial length of the magnetic polar base.

7. The motor of claim 1, wherein the stator has a magnetic path, around which a coil is wound, located radially inwardly from the magnetic pole is formed smaller in sectional area than the magnetic pole.

8. An electronic device comprising a driven unit and a motor coupled to the driven unit, the motor comprising:
- a stator having a plurality of magnetic poles disposed in a circumferential direction along an outer periphery thereof;
- a rotor disposed rotatably around the outer periphery of the stator; and
- a magnet disposed in a circumferential direction along an inner periphery of the rotor, wherein:
- the stator has a laminated body formed with sheet-like plates laminated in an axial direction;
- sheet-like plates of the laminated body located on one axially outermost side comprise a flat portion substantially perpendicular to the axial direction, an extended portion extending outwardly in substantially parallel to the axial direction and a boundary portion connecting the flat and extended portions, wherein the extended portion is formed with two or more sheet-like plates laminated together on the one axially outermost side which terminate correspondingly with each other; and
- the outermost sheet-like plate of the sheet-like plates comprises a magnetic flux impeding section made thinner than a remaining section of the outermost sheet-like plate, wherein the magnetic flux impeding section is extensive with the boundary portion.

9. The electronic device of claim 8 further comprising a wiring board, wherein the motor is mounted on the wiring board, and a magnetic sensing element is mounted on the wiring board in juxtaposition with the magnet of the motor.

10. The electronic device of claim 9, wherein the magnetic sensing element comprises a Hall IC.

11. A motor comprising:
- a stator having a plurality of magnetic poles disposed in a circumferential direction along an outer periphery thereof;
- a rotor disposed rotatably around the outer periphery of the stator; and
- a magnet disposed in a circumferential direction along an inner periphery of the rotor, wherein:
- the stator has a laminated body formed with sheet-like plates laminated in an axial direction;
- sheet-like plates of the laminated body located on one axially outermost side comprise a flat portion substantially perpendicular to the axial direction, an extended portion extending outwardly in substantially parallel to the axial direction and a boundary portion connecting the flat and extended portions, wherein the extended portion is formed with two or more sheet-like plates laminated together on the one axially outermost side which terminate correspondingly with each other; and
- the outermost sheet-like plate of the sheet-like plates comprise means for impeding a magnetic flux.

12. The motor of claim 11, wherein the means for impeding a magnetic flux is extensive with boundary portion.

* * * * *